INVENTORS.
Alfred Hesse
Wolfgang Bindel
Heinz Focken
BY Michael S. Striker
ATTORNEY

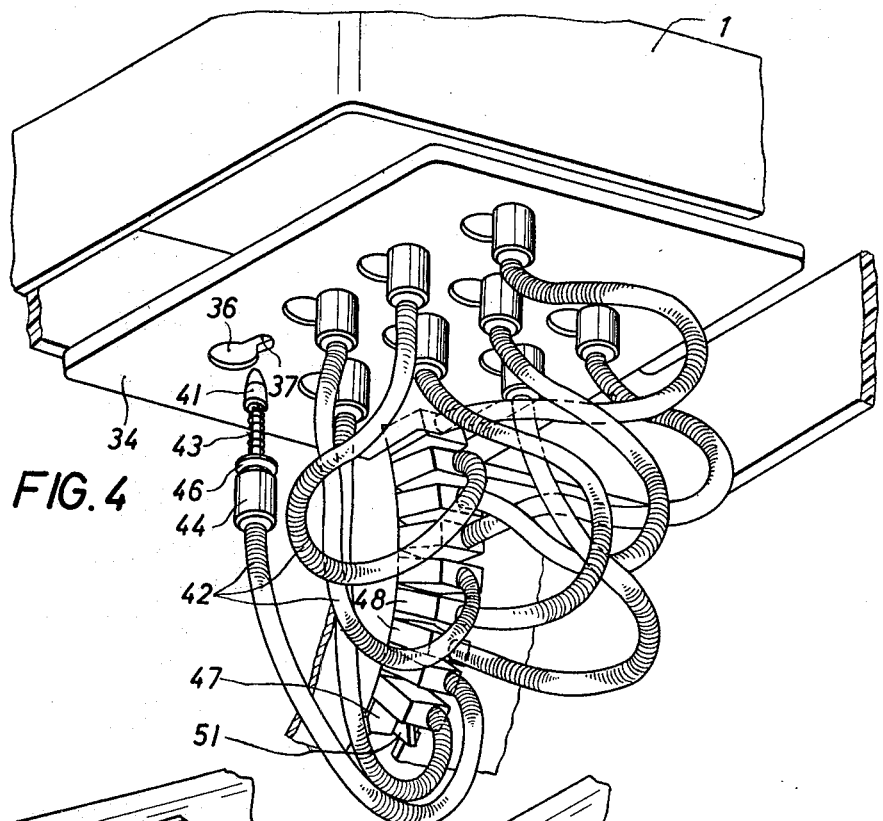
FIG. 4
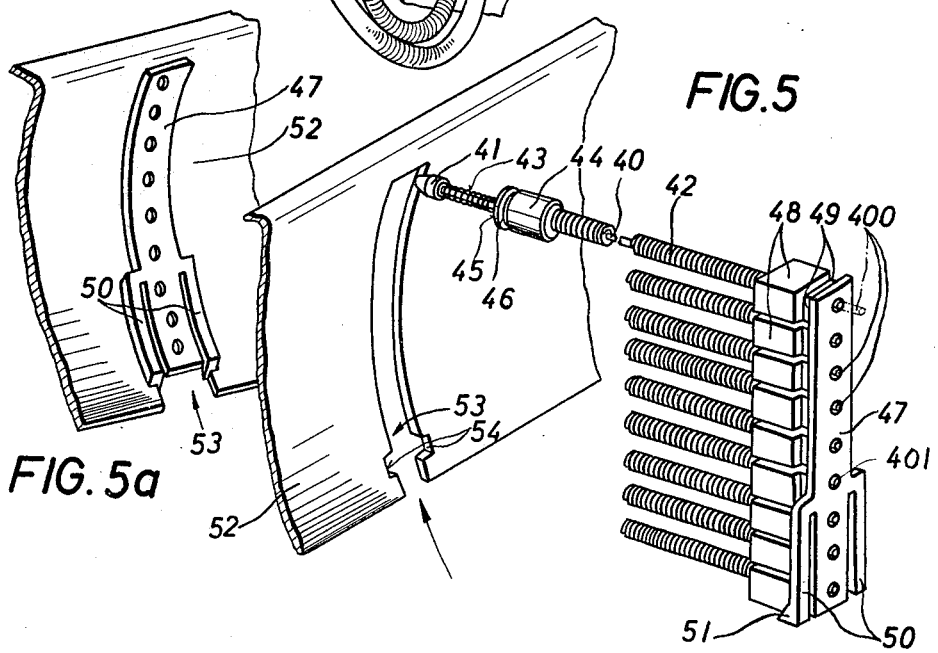
FIG. 5
FIG. 5a

United States Patent Office 3,497,679
Patented Feb. 24, 1970

3,497,679
INPUT ARRANGEMENT FOR A PIN CARRIAGE
Alfred Hesse, Wolfgang Bindel, and Heinz Focken, Wilhelmshaven, Germany, assignors to Olympia Werke AG, Wilhelmshaven, Germany
Filed Dec. 22, 1967, Ser. No. 692,887
Claims priority, application Germany, Dec. 24, 1966, O 12,179
Int. Cl. G06c 29/00
U.S. Cl. 235—60                                  26 Claims

ABSTRACT OF THE DISCLOSURE

The pins of the pin carriage of a calculator are set by the end portions of the inner members of interchangeable Bowden cables of equal lengths which are operated by keys mounted on supporting means which also support the outer tubular member of the Bowden cables. The supporting structure, the keys, the inner members, and the end portions of the outer members are made of a synthetic plastic material and detachably secured to each other without the use of screws.

BACKGROUND OF THE INVENTION

According to the U.S. Patent 3,151,546, the pins of a pin carriage are set by flexible coil springs operated by keys. The coil springs are mounted in guide channels of a guide structure for longitudinal movement. The force transmitting coil springs are disposed in a plane, and the key stems are provided with several attaching projections which are connected with the coil springs in different positions of the keys. For constructive reasons, the stems of the keys have to be offset which has the disadvantage that different tools have to be provided for making the keys of a synthetic material. It is also necessary to provide coil springs, and a series of different keys has to be manufactured and stored for service.

Since the coil springs are guided in the guide channels in curved condition, the friction is high and causes jamming of the coil springs.

The U.S. Patent 2,667,304 discloses tubular members in which tightly wound coil springs are mounted for longitudinal movement for connecting key means with setting means for the pins of the pin carriage. The tubular members are made of metal, and soldered to a supporting plate in the region of the pin carriage. Tubular members of different lengths are required, and a great number of parts have to be manufactured and stored, and assembled in a time-consuming operation.

SUMMARY OF THE INVENTION

It is one object of the invention to overcome the disadvantages of known input arrangements for a pin carriage of the type using flexible connectors between the keys and the parts by which the pins of the pin carriage are set.

Another object of the invention is to provide an input arrangement for a pin carriage which can be inexpensively manufactured, and quickly assembled, or disassembled for service.

Another object of the invention is to provide a pin carriage with an input arrangement without screw connections, soldered connections, or clamping connections.

Another object of the invention is to provide a pin carriage with an input arrangement producing little friction so that the keys can be operated by application of a very small manual force.

With these objects in view, the present invention is concerned with an improvement of an input arrangement for a pin carriage which has settable pins. One embodiment of the invention comprises a set of key means, a set of connectors, such as Bowden cables, having flexible outer tubular members supported by stationary supporting means, and flexible inner members having first end portions detachably attached to the key means and second end portions respectively located opposite the pins of the pin carriage, all connectors having the same length and being interchangeable.

Upon movement of any selected key means to an actuated position, the respective inner member of the Bowden cable is displaced so that its second end portion displaces and sets a respective pin of the pin carriage.

In the preferred embodiment of the invention, the supporting means consist of a synthetic plastic material and include a first support supporting and guiding the key means and a second support located in the proximity of the pin carriage. The outer members of the Bowden cables have at one end attaching means detachably connected with the first support, and at the other end attaching means detachably attached to the second support.

The key means include a key and a hollow key stem consisting of a plastic synthetic material, and the first end portion of each inner member has a spring biased head located in a hollow stem and abutting the same for urging the respective key to its normal position. The construction of the present invention uses interchangeable Bowden cables having the same length and operated by identically constructed key means so that cost of manufacture and storage is reduced.

Since the force transmission between the keys and the pins of the pin carriage is obtained by flexible Bowden cables which can be used in curved condition, the arrangement can be used for different types of business machines in which the longitudinal, transverse, and vertical distances between the keyboard and the pin carriage are different. The Bowden cables permit an adaptation to differences in three dimensions.

The input arrangement of the invention can be advantageously used not only for setting a standard pin carriage, but also for setting a straight pin carriage which is not sensed by levers but by bars. Due to the flexibility of the Bowden cables, which can be used in a curved condition in smaller machines, and in a more straightened position in larger machines, the input arrangement can be used with any type of pin carriage in any type of calculator or business machine.

In order to eliminate screws and soldered connections, the several parts of the apparatus are connected to each other by detachable attaching means having projecting portions slidingly engaging corresponding grooves, or comprising resilient catches which snap into a holding position for attaching two parts to each other.

The first support on which the keys and key stems are mounted has the form of a box open at the bottom, and closed by a bottom plate. The outer member of the Bowden cables are preferably attached to the bottom plate by bayonet-like attaching means.

A set of identical keys and key stems for setting the pin carriage, and a second set of identical function keys and key stems are provided. While the digit keys are urged to the normal inoperative position by the spring biased inner members of the Bowden cables, springs located in blind holes in guide blocks of the box-shaped first support are provided for urging the function keys to the inoperative normal position.

In order to obtain a particular flexibility and elasticity of the inner members of the Bowden cables, which consist of a synthetic plastic material, annular grooves are provided in the inner members spaced along the length of the same. Where greater rigidity of the inner members is required, for example in the regions of the ends of the inner members, the annular grooves are omitted. Since the inner members and the heads thereof are pressed in a single operation by a divided tool, longitudinal seams are produced at diametrical points of the inner member. In accordance with the invention, the inner members have an obling, oval cross section so that in the region of the smaller dimension of the oval cross section, spaces are left between the inner member and the outer member which has a circular cross section, and the seams are located in these spaces so that the seams do not produce any undesired friction. Furthermore, the operation otherwise required for removing the seams can be eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a fragmentary perspective view illustrating an embodiment of the invention;

FIG. 5 is a fragmentary perspective view illustrating an embodiment of the invention during assembly;

FIG. 5a is a fragmentary perspective view illustrating a part of the embodiment of FIG. 5 in assembled condition;

DESCRIPTION OF THE PREFERRED EMBODIMENT

Figure 1:
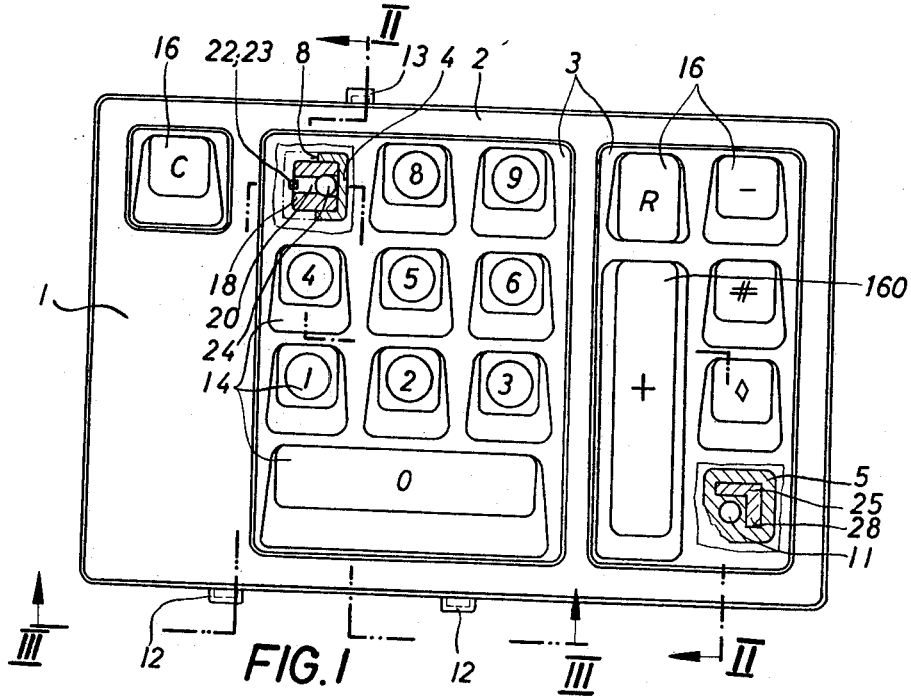
FIG. 1 is a plan view illustrating the keyboard of a calculator provided with an input arrangement according to the invention.

FIGS. 1, 2, 3 and 6 illustrate a keyboard according to the invention provided in a ten-key calculator. The construction of the keyboard has advantages over the prior art inasmuch as material is saved, a smaller number of tools is used for manufacture, and the time required for assembly, or disassembly of the parts for the purpose of service, is reduced.

A keyboard support 1 is box-shaped and has a top plate 2 in which recessed portions 3 are provided for receiving digit keys 14 and function keys 16, 160. Keys 14, 16 and 160 are movable between a higher normal position and a lower actuated position, and the distance of movement corresponds to the depth of the recessed portions 3 of top plate 2. Peripheral walls 2a project downward from top plate 2 and form a rectangular opening at the bottom of the box-shaped support 1. Guide blocks 4 and 5 are secured to the depressed portions 3 and project downward from the same. Guide blocks 4 have rectangular channels 6 for guiding the stems 18 of the digit keys 14, and guide blocks 5 have L-shaped channels 7 for guiding the L-shaped stems 25 of function keys 16. The box-shaped support 1 with top plate 2, 3, guide blocks 5 and 4, and peripheral walls 2a is made as an integral body consisting of a synthetic plastic material.

As is apparent from FIGS. 1, 2, 3 and 6, guide blocks 4 have a lateral cutout 8 with an abutment edge 9 on which an abutment portion 23 of key stem 18 of a digit key 14 abuts in the normal inoperative position of key 14. As best shown in FIG. 1, the cross section of guide block 4 is rectangular above cutout 8, and U-shaped below the same.

Figure 6:
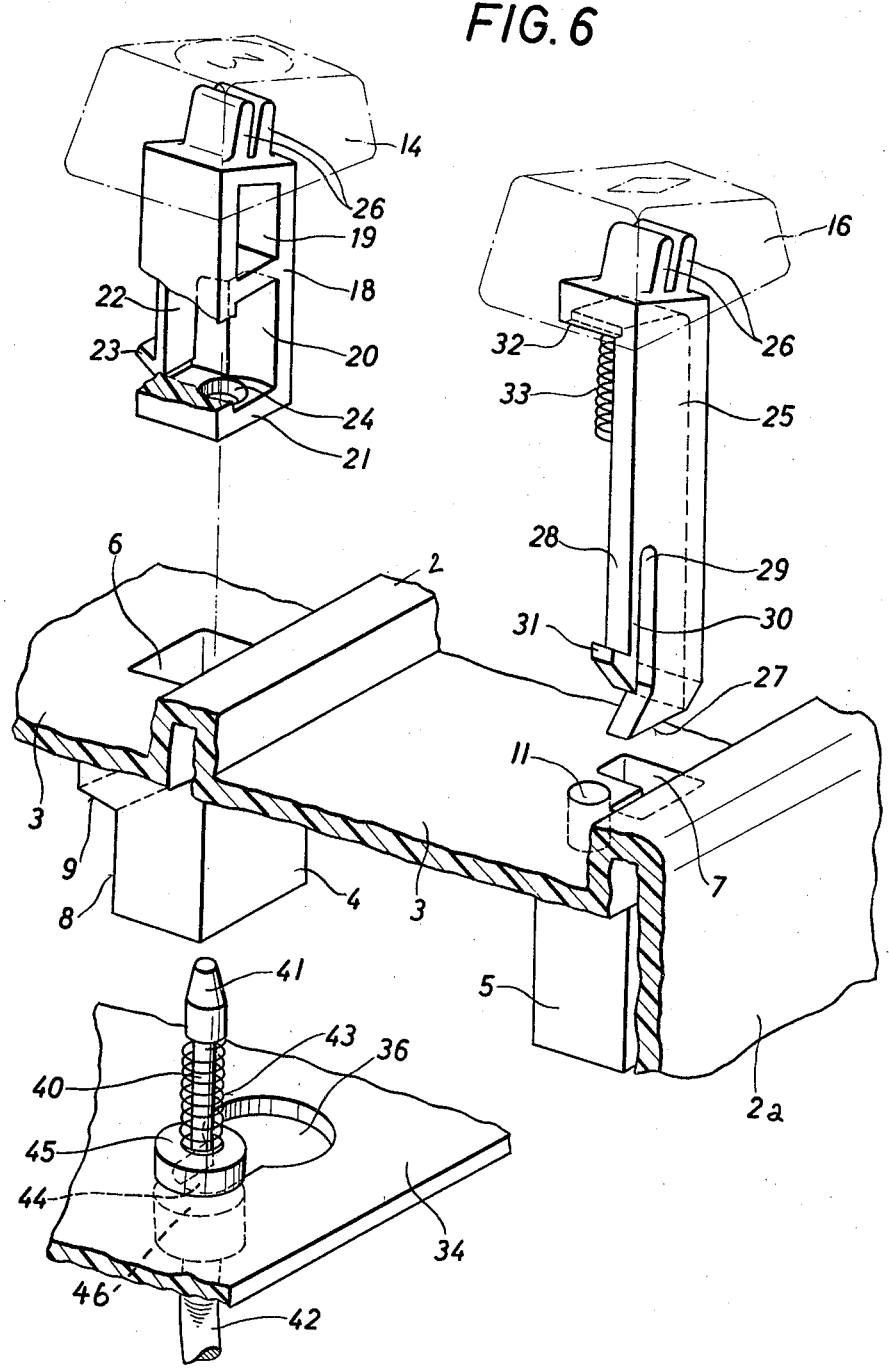
FIG. 6 is a fragmentary perspective exploded view illustrating the keyboard of the apparatus of FIG. 1.

Guide blocks 5 for the stems 25 of the function keys 16 have a rectangular cross section. One of the bottom edges of each guide block 5 is constructed as an abutment edge 10 engaged by a portion 31 of an arresting portion 30 of stem 25. While stem 25 is shown in FIG. 6 to carry a function key 16, a stem 25 also carries the key bar 160. Arresting means 30, 31 is formed by a slot 29 in key stem 25 and resiliently yields when stem 25 is inserted into the guide channel 7, but when key stem 25 is fully inserted, portion 31 is located below the abutment edge of a guide block 5 and engages the same when a spring 33 urges key means 16, 25 to the higher inoperative position. Spring 33 is guided in a blind hole 11 in guide block 5, and abuts at its upper end, an abutment plate 32 at the upper end of stem 25. Abutment plate 32 has a beaded edge for holding the end of spring 33 in position. The open bottom end of the box-shaped support 1 is closed by a detachable bottom plate on which the lower end faces of guide blocks 4 and 5 abut. Walls 2a have at the lower end, resilient arresting portions 13 which are inserted into corresponding openings 35 in a portion 38 of bottom plate 34 for detachably attaching bottom plate 34 to the keyboard support 1. Walls 2a also have lugs 12 which, together with bottom plate portion 38, are used for mounting the keyboard support 1 in the casing of a calculator.

Key stems 18 of digit keys 14 are mounted in the rectangular guide slots 6 for smooth sliding movement, and consist of a synthetic plastic material. In order to reduce the weight and to save material, key stems 18 have an upper cavity 19, and a lower cutout 20 forming a bottom portion 21 with a bore 24. The L-shape of stems 25 of function keys 16 also assures lightweight but rigidity of key stems 25 which also consist of a synthetic plastic material. The lower end face 27 of each key stem 25 cooperates with parts of the calculator by which functions of the same are initiated in the usual manner.

Integral attaching portions 26 are provided at the upper ends of key stems 18 and 25, and are inserted into corresponding recesses in keys 14 and 16 to form a detachable connection.

Digit key means 14, 18 are connected to the inner members 40 of Bowden cables. As best seen in FIGS. 4 and 6, each inner member 40 has a first end portion including a head 41 which is partly cylindrical and partly frustoconical. The corresponding outer tubular member 42, in which inner member 40 is mounted for longitudinal sliding movement, has a cylindrical attaching portion 44 with an annular groove 46 and an abutment end face 45. A coil spring 43 abuts abutment face 45 and the annular bottom face of head 41 to urge head 41 and thereby inner member 40 upwardly out of the outer tubular member 42 of the respective connector. Coil spring 43 surrounds the end portion of the inner member 40.

The outer members 42 of the Bowden cables are attached to the keyboard support, and more particularly to the bottom plate 34. Bottom plate 34 has a bayonet slot 36 for each Bowden cable, each bayonet slot having a narrow portion and a wide portion. The wide portion permits insertion of the cylindrical attaching member 44 to a position in which groove 46 is located at the level of bottom plate 34, whereupon the Bowden cable is laterally shifted until the edge of the narrow slot portion engages the groove 46, with the confronting annular faces forming the side walls of groove 46 tightly abutting the upper and lower surfaces of bottom plate 34 so that attaching member 44 is positioned perpendicularly to bottom plate 34, and thereby holds the end portion of the inner member 14 in a position perpendicular to bottom plate 34. Head 41 is inserted through bore 24 in the bottom portion 21 of stem 18 of each digit key so that the end face of head 41 abuts the transverse wall of stem 18 between cavity 19 under the action of spring 43 and urges key means 18, 14 upward to the normal inoperative position. Upon actuation of a digit key 14, spring 43 is compressed and the inner member 40 shifted in longitudinal direction in outer tubular member 42 of the respective Bowden cable since the outer tubular member 42 is stationarily, but detachably, attached to the keyboard support 1, and more particularly to bottom plate 34 of the same.

Preferably, the tubular outer member 42 consists of a tightly wound wire coil, and the attaching portion 44 consists of a synthetic plastic material and is permanently attached to the wire coil of the outer member 42 by injection molding.

The other ends of the tubular outer members 42 of the Bowden cables are secured to another attaching means, as shown in FIGS. 4, 5 and 5a. A block of synthetic plastic material 48 is permanently attached to the other end of each tubular outer member 42 by injection molding. Blocks 48 are part of a slide member 47, common to all Bowden cables, and forming lateral guide grooves 49 with blocks 48. Slide member 47 has lateral attaching portions 50 provided with catch projections 51.

The attaching means 47, 47 is attached to a second support plate 52 which has a slot 53 with lateral recesses 51. During assembly, attaching means 48, 47 is inserted into slot 53, with the lateral edges of the slot sliding in the lateral guide grooves 49 until the catch projections 51 snap into the recesses 54 in the final assembled position shown in FIG. 5a. The support plate 52 is shown to be curved, and the attaching means 48, 47, which consists of a synthetic plastic material, is flexible and assumes the curved shape of support plate 52 when inserted into slot 53. However, it is also possible to provide a planar support plate 52 if required by the construction of the pin carriage.

Slide member 47 has nine bores 401 in which the other end portions 400 of the inner members 40 are respectively located, as shown in FIG. 5. If a digit key 14 is actuated and depressed, head 41 with inner member 40 is displaced against the action of spring 43 so that the other end portion 400, which has the shape of a pin, projects out of the respective bore 401.

A conventional pin carriage, not shown, has a row of settable pins which are respectively located opposite bores 401 and setting pin portions 400 aligned with the same, and being spaced from the bores 401 of slide members 41 such a distance that any setting pin portion 400 engages and sets the respective pin of the pin carriage when the inner member 40 of the respective Bowden cable is shifted by operation of a digit key 14. The curved shape of support plate 52 and the corresponding curved shape of slide member 47 with attaching blocks 48, corresponds to the position of the pins of the used pin carriage.

As best seen in FIG. 4, the Bowden cables, and more particularly the outer tubular members 42 of the same, all have the same length which is greater than required by the shortest distance between support plate 52 and bottom plate 34 so that the Bowden cables form open loops. This arrangement permits the manufacture and storing of Bowden cables of standard length which can be used in all kinds of calculators irrespective of the position and distance of the pin carriage in relation to the keyboard support. In the normal inoperative position of the calculator, springs 43 urge the inner members 40 upward out of the outer members 42 together with head 41 which holds the respective key stem 18 with key 14 in the higher normal inoperative position. When a key 14 is depressed, head 41 moves downward against the action of spring 40, and displaces inner member 40 in the outer member 42 so that the setting pin portion 400 is pushed out of the respective bore 401 of slide member 47 which is detachably attached to the stationary support plate 52. Any setting pin portion 400 which is pushed out, engages, displaces, and sets a corresponding pin of the pin carriage, not shown. When key 14 is released by the operator, the respective spring 43 pushes the end portion of inner member 40 with head 41 out of the stationarily held outer member 42 so that the head 41 engages the transverse abutment plate of key stem 18 and pushes key means 14, 18 up to the normal position. No other spring is provided for raising digit key means 14, 18 so that spring 43 performs this function in addition to returning the inner member 40 to its normal position.

All above-described parts of the arrangement are made of a synthetic plastic material, and the construction is such that all connections between the parts are made without screws, soldering or clamping, the several attaching means being constructed to provide detachable connections by flexible arresting catches, for example 23 and 30, or by a bayonet-like connection, as shown for attaching means 44.

Figures 7, 8:
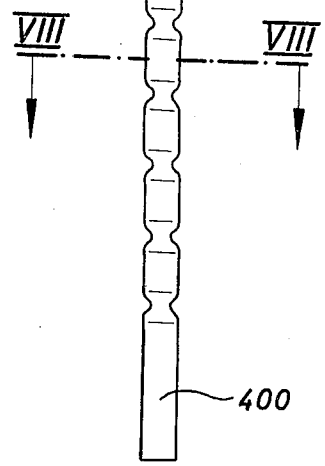
FIG. 7 is an elevation illustrating the inner member of a Bowden cable used in the embodiment of FIG. 4.
FIG. 8 is a cross section of the inner member of the Bowden cable taken along line VIII—VIII in FIG. 7.

A preferred construction of the inner member 40 of the Bowden cables is shown in FIGS. 7 and 8. The inner member 40 has a first end portion carrying the head 41 and a second end portion 400 serving as a setting pin for the respective pin of the pin carriage. The main portion between the end portions of the inner member, has a plurality of annular grooves 401 spaced along the length of the same so that the flexibility of the inner member 40, which consists of a plastic synthetic material, is increased, while the end portions are more rigid, as required by the function to be performed by the inner member 40.

As shown in FIG. 8, the cross section of the inner member 40 is oblong and oval. The outer member 42 has a tubular circular cross section whose diameter corresponds to the longer dimension of the oval cross section of the inner member 40 so that the inner member is slidably guided in the outer member. Consequently, lateral diametrically disposed points or lines of the smaller dimension of the oval cross section, are spaced from the inner surface of the circular tubular outer member, forming two longitudinally extending spaces in the same.

Since each inner member 40 and head 41 has to be made as an injection molded part, a divided mold must be used which produces lateral longitudinally extending diametrically disposed seams which would cause friction if the cross section of the inner member 40 were circular, and would have to be removed.

In the arrangement of the invention, the seams are located in the region of the smaller dimension of the oval cross section of the inner member and consequently located in the spaces formed between the same and the outer member so that no friction is produced, and it is not necessary to remove the seams whereby the inner members can be more economically manufactured. If the seams radially project for a greater distance than provided by the spaces in the outer member, they are bent over which in no way detrimentally affects the longitudinal sliding of the inner member 40 in the outer member 42.

During assembly, first attaching slide member 47 is inserted into the slot 53 of support plate 52, together with the Bowden cables whose outer members 42 are secured to blocks 48 by injection molding the latter. The inner members 40 are already in the outer members and the heads 41 are urged by springs 43 to move away from attaching portions 44 and are held in the projecting position shown for one Bowden cable in FIG. 4.

The cylindrical attaching means 44 is now inserted into slot 36 of plate 34 which is detachably attached to the casing of the calculator and by transversely shifting attaching portion 44 in slot 36, the respective ends of the outer members 42 are detachably attached to plate 34 in a position in which the end portions of the inner members project from plate 34 perpendicularly to the same.

Figures 2, 3:
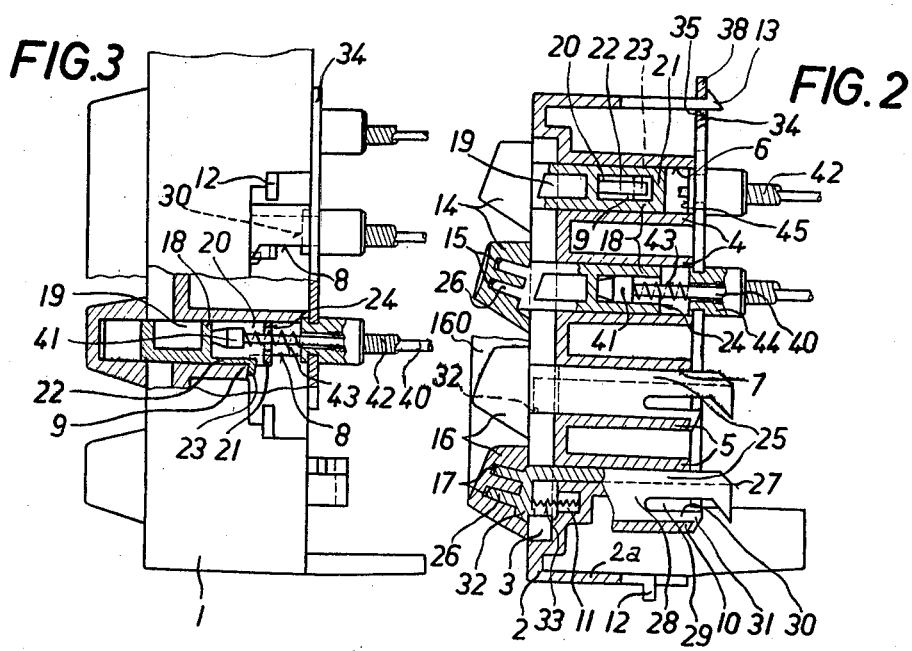
FIG. 2 is a sectional view taken along line II—II in FIG. 1.
FIG. 3 is partially a front view of the apparatus of FIG. 1, and partially a sectional view taken along line III—III.

The box-shaped keyboard support 1 is now attached to the stationarily supported bottom plate 34 by arresting catches 13, see FIG. 2.

Key stems 18 with digit keys 14 are now inserted into the guide channels 6 of the guide blocks 4 so that the heads 41 pass through the bores 24 in the bottom portions 21 of stems 18, see FIG. 6. When a head abuts a key stem 18, key 14 is manually depressed so that the head is pushed downward and compresses spring 43. During this downward movement, catch portion 22, 23 was resiliently deformed by a wall of channel 6, and when portion 23 arrives in a position located below the cooperating abutment edge of guide block 4, it snaps out and holds the respective key means 14, 18 in the normal inoperative position. When a key 14 is actuated and further depressed, inner member 40 is displaced, and pushes setting pin portion 400 out of the respective bore 401 in the attaching slide member 47 to set the corresponding aligned pin of the pin carriage, not shown. Upon release of a digit key 14, spring 43 returns the inner member to its normal position while at the same time raising key means 14, 18 to its normal position.

The function keys 16 which do not operate inner members of Bowden cables, are easily assembled by inserting the L-shaped stems 25 into the guide channel 7 until the respective arresting catch 30, 31 snaps out of the guide channel and engages with portion 31 a bottom abutment of guide block 5 to hold key means 16 and 160, respectively, in a normal position into which it is urged by spring 33. Upon depression of key 16, spring 33 is compressed since its lower end abuts the end of the blind bore 11, and the end face 27 performs the function of actuating an element of the calculator, not shown, by which a function, such as addition or subtraction is carried out. It is advantageous that the keyboard of the input arrangement of the present invention, can be adapted for easy assembly of function keys made of a synthetic plastic material, as are the other parts of the arrangement.

It will be understood that each of the elements described above, or two or more together, may also find a useful application in other types of keyboard and input arrangements for calculators differing from the types described above.

While the invention has been illustrated and described as embodied in a keyboard arrangement consisting entirely of synthetic plastic material, and controlling an input device comprising Bowden cables for setting the pins of a pin carriage, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Input arrangement for a pin carriage having settable pins, comprising, in combination, supporting means, a set of key means mounted on said supporting means for movement between a normal position and an actuated position, each key means including a key and a hollow key stem; a set of Bowden cables, each having a flexible outer tubular member stationarily supported by said supporting means and a flexible inner member, said inner members having first end portions detachably connected to said key means, and located in said hollow stem of the respective key means abutting the same, respectively, so that movement of any selected key means to said actuated position displaces the respective inner member, said inner members having second end portions respectively located opposite said pins of said pin carrage in such a position that said second end portion of a flexible inner member displaced by a selected key means displaces and sets the respective pin of said pin carriage.

2. Input arrangement as claimed in claim 1 wherein said supporting means include a first support supporting and guiding said key means and a second support spaced from said first support and located in the proximity of said pin carriage; wherein said Bowden cables have the same length; wherein said flexible outer members have at one end first attaching means detachably connected with said first support, and at the other end second attaching means detachably attached to said second support; and wherein said first end portion of each inner member is spring biassed against respective key means.

3. Input arrangement as claimed in claim 2 wherein said second attaching means include a slide member; and wherein said second support has a slot slidingly receiving said slide member for supporting said other ends of said outer members.

4. Input arrangement as claimed in claim 3 wherein said second support has recesses; and wherein said slide member has resilient catch projections engaging said recesses for detachably arresting said slide member in said slot of said second support.

5. Input arrangement as claimed in claim 3 wherein said slide member has lateral guide grooves; and wherein said slot has lateral edges slidingly disposed in said grooves.

6. Input arrangement as claimed in claim 2 wherein said first support includes a plate having a set of bayonet slots, each having a wide portion and a narrow portion; and wherein said first attaching means include a set of first attaching members having peripheral grooves slidingly engaged by the edges of said narrow portions, and adapted to be inserted and removed through said wide portions of said bayonet slots.

7. Input arrangement as claimed in claim 6 wherein said first end portion of each inner member has a head located in said hollow key stem; and wherein each Bowden cable comprises a spring abutting said head and said first attaching member of the respective Bowden cable so that said key means is urged to said normal position by said head.

8. Input arrangement as claimed in claim 7 wherein said spring is a coil spring surrounding a portion of said inner member located between said head and said first attaching member.

9. Input arrangement as claimed in claim 2 wherein said first support is made of an injection molded synthetic material and includes a box-shaped top member having a top plate, walls downwardly projecting from the periphery of said top plate and forming an opening at the bottom of said top member, a bottom plate detachably secured to said walls and closing said opening, and a set of guide blocks downwardly projecting from said top plate and having guide channels for guiding said key stems and end faces abutting said bottom plate; and wherein said first attaching means of said outer members are detachably attached to said bottom plate.

10. Input arrangement as claimed in claim 9 wherein said walls of said box-shaped top member and said bottom plate have cooperating arresting means for detachably attaching said bottom plate to said walls.

11. Input arrangement as claimed in claim 9 wherein said top plate has a set of recessed portions for receiving said keys, respectively, said guide blocks projecting downward from said recessed portions and said guide channels penetrating the same, said recessed portions having a depth corresponding to the distance of movement of said keys from said normal position to said actuated position.

12. Input arrangement as claimed in claim 9 wherein said key stems and guide channels have rectangular cross sections and have cutouts in the lower end portions thereof for receiving said first end portions of said inner members of said Bowden cables.

13. Input arrangement as claimed in claim 12 wherein said cutout in each key stem forms a thin rectangular bottom plate at the lower end of each key stem, said rectangular bottom plate having a bore for said first end portion of said inner member, said first end portion forming a head having a cylindrical portion and a frusto-conical end.

14. Input arrangement as claimed in claim 13 wherein each Bowden cable includes a spring abutting said head and said first attaching means and urging said head into engagement with said key stem so that said key means is urged into said normal position; wherein each key stem has a resilient catch abutting the respective guide block in said normal position of said key means.

15. Input arrangement as claimed in claim 9 including a plurality of function key means having L-shaped key stems; a plurality of additional guide blocks downwardly projecting from said top plate and having ends abutting said bottom plate, each guide block having an L-shaped channel for receiving said key stem of one of said function keys, each L-shaped key stem having an abutment at the upper end thereof, each function key means including a return spring abutting said abutment and being located in a blind bore of the respective guide block so that each function key means is urged into a normal position; and wherein each L-shaped key stem has a resilient catch abutting the respective guide block in said normal position of the respective function key means.

16. Input arrangement as claimed in claim 2 wherein said inner members, said keys and said key stems, said first and second supports, and said first attaching means consist of a synthetic plastic material.

17. Input arrangement as claimed in claim 16 wherein each of said key stems has attaching projections fitting into corresponding recesses in said keys whereby the latter are attached to said key stems.

18. Input arrangement as claimed in claim 2 wherein said first attaching means and said second attaching means consist of a synthetic plastic material permanently injection molded to said outer members, respectively.

19. Input arrangement as claimed in claim 2 wherein each inner member consists of a synthetic plastic material and has a main portion between said end portions, said main portion being formed with annular recesses spaced along the length of said main portion for rendering said main portion flexible.

20. Input arrangement as claimed in claim 2 wherein each outer member has a circular cross section, and each inner member has an oblong cross section whose greater dimension corresponds to the diameter of said circular cross section.

21. Input arrangement as claimed in claim 20 wherein each inner member is made by injection molding and has longitudinal seams at diametrical points of the smaller dimensions of said oblong cross section of said inner member and located in the spaces between said outer member and said inner member in the region of said smaller dimension of said oblong cross section.

22. Key controlled setting arrangement for settable elements, comprising, in combination, a first support having a set of attaching portions; a set of key means mounted on said first support adjacent said attaching portions, respectively, for movement between a normal position and an actuated position, said key means being associated with said settable elements and spaced different distances from the same, respectively; a second support spaced from said first support and located in the proximity of said settable elements; a set of flexible elongated connectors, each connector having a flexible tubular outer member and a flexible inner member slidably guided in said outer member for longitudinal movement in the same, said outer members having at one end thereof first attaching means detachably attached to said attaching portions, respectively, of said first support; and second attaching means for attaching the other ends of said outer members to said second support; said inner members having first end portions adjacent said first attaching means, respectively, and cooperating with said key means, respectively, and second end portions in the region of said second attaching means and adapted to be located opposite said settable elements, respectively, so that movement of any selected key means to said actuated position displaces the respective inner member in the respective outer member for setting the respective settable element by said second end portion; and all said connectors having the same length which is greater than the greatest distance between any key means and any settable element so that any connector can be used for operatively connecting any settable element with any key means by attaching said first attaching means to different attaching portions of said first support.

23. Key controlled setting arrangement as claimed in claim 22, wherein each connector include a spring biassing said inner member against the respective key means for urging the same to said normal position.

24. Key controlled setting mechanism as claimed in claim 22, wherein at least said key means, said connectors, and said first and second attaching means are made of a synthetic plastic material.

25. Key controlled setting arrangement as claimed in claim 24, wherein each outer member has a circular cross section and each inner member has an oblong cross section whose greatest dimension corresponds to the diameter of said circular cross section so that molding seams on the smallest dimension of said inner member do not engage said outer member.

26. Key controlled setting arrangement as claimed in claim 22, wherein said second attaching means fixedly connects said other ends of said outer members, and is detachably connected with said second support.

References Cited

UNITED STATES PATENTS

| | | | |
|---|---|---|---|
| 2,667,304 | 1/1954 | Wallach et al. | 235—60.31 |
| 2,988,274 | 6/1961 | Carlsen et al. | 235—60 XR |
| 3,095,143 | 6/1963 | Oldenburg et al. | 235—60 |

FOREIGN PATENTS 81,276  11/1951  Poland.

RICHARD B. WILKINSON, Primary Examiner

STANLEY A. WAL, Assistant Examiner